Sept. 18, 1951 E. H. BECHBERGER 2,568,604
SIGNATURE FEEDING AND TRANSFERRING MECHANISM
Filed June 6, 1946 10 Sheets-Sheet 1

INVENTOR.
EARL H. BECHBERGER
BY
Kwis, Hudson, Boughton & Williams
ATTORNEYS

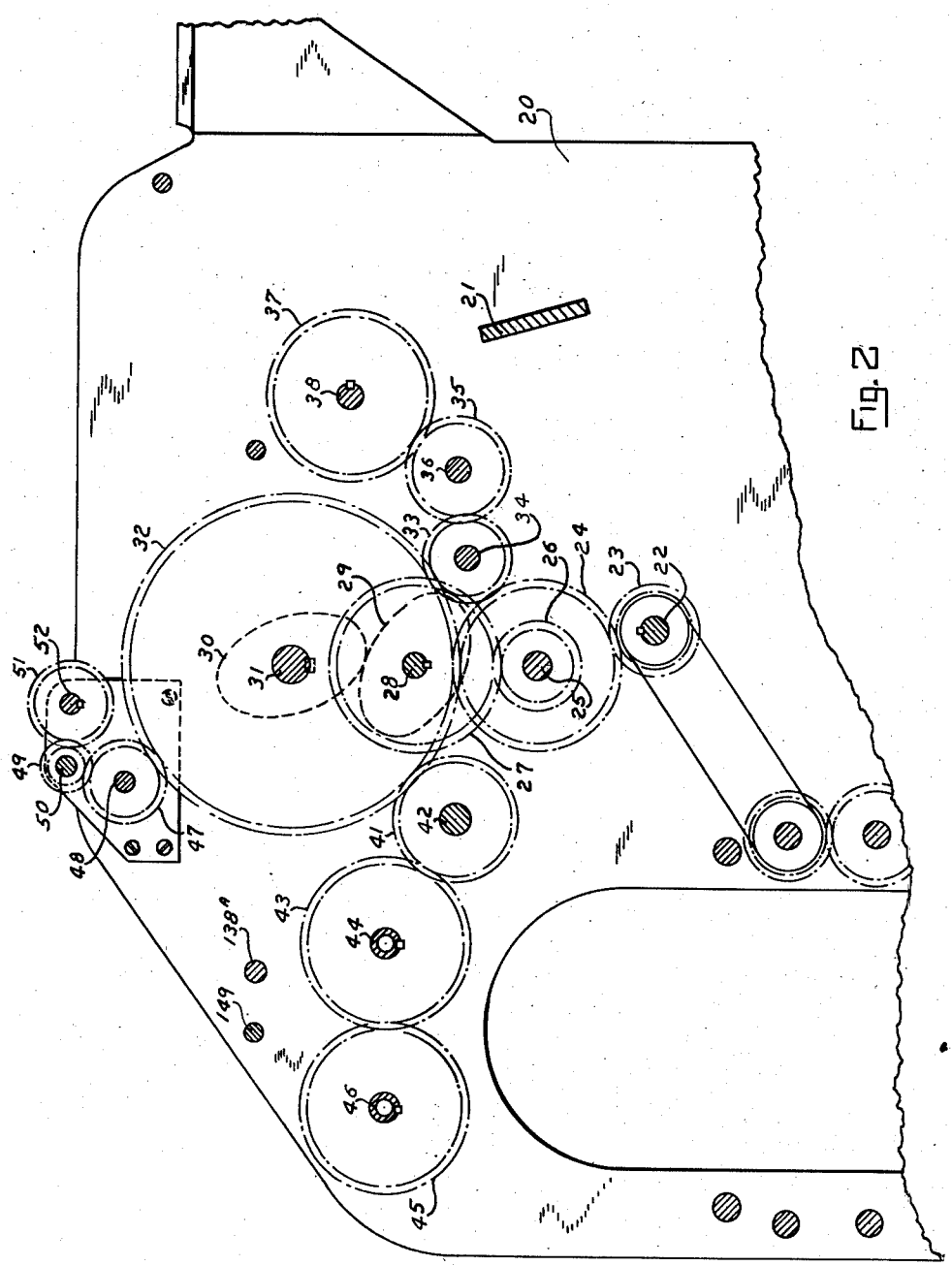

Sept. 18, 1951  E. H. BECHBERGER  2,568,604
SIGNATURE FEEDING AND TRANSFERRING MECHANISM
Filed June 6, 1946  10 Sheets-Sheet 3
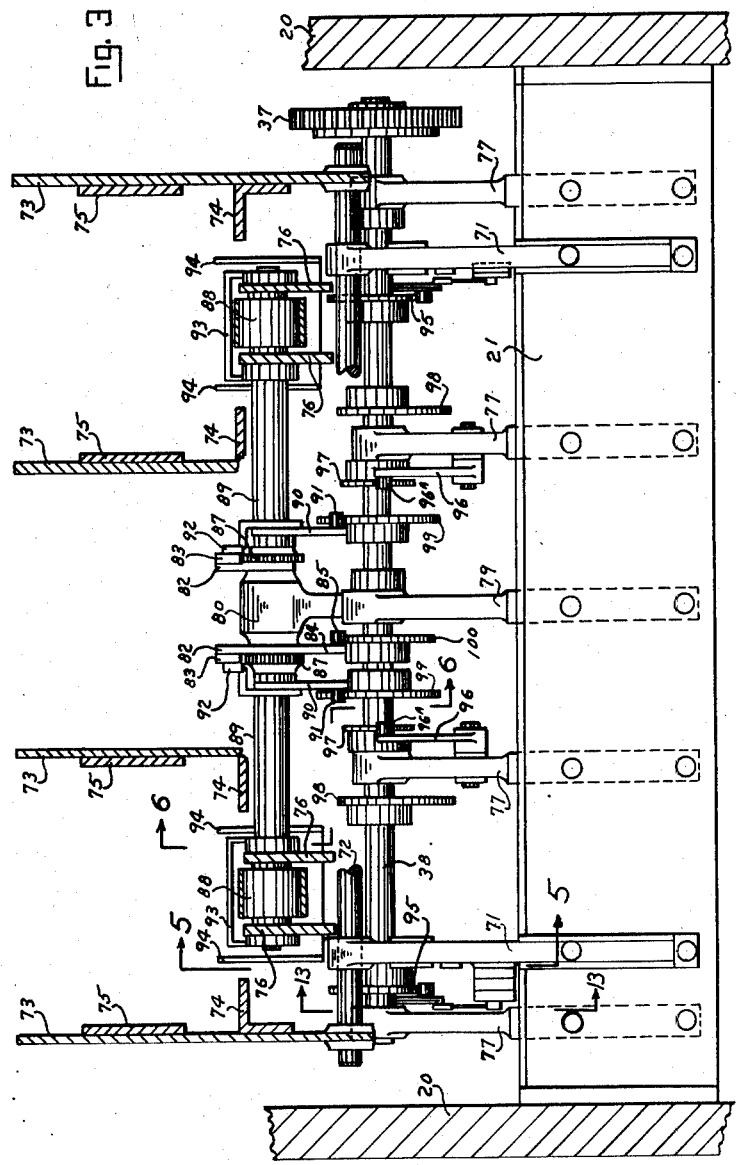
INVENTOR.
EARL H. BECHBERGER
BY
Kwis, Hudson, Boughton & Williams
ATTORNEYS Sept. 18, 1951     E. H. BECHBERGER     2,568,604
SIGNATURE FEEDING AND TRANSFERRING MECHANISM
Filed June 6, 1946     10 Sheets-Sheet 4
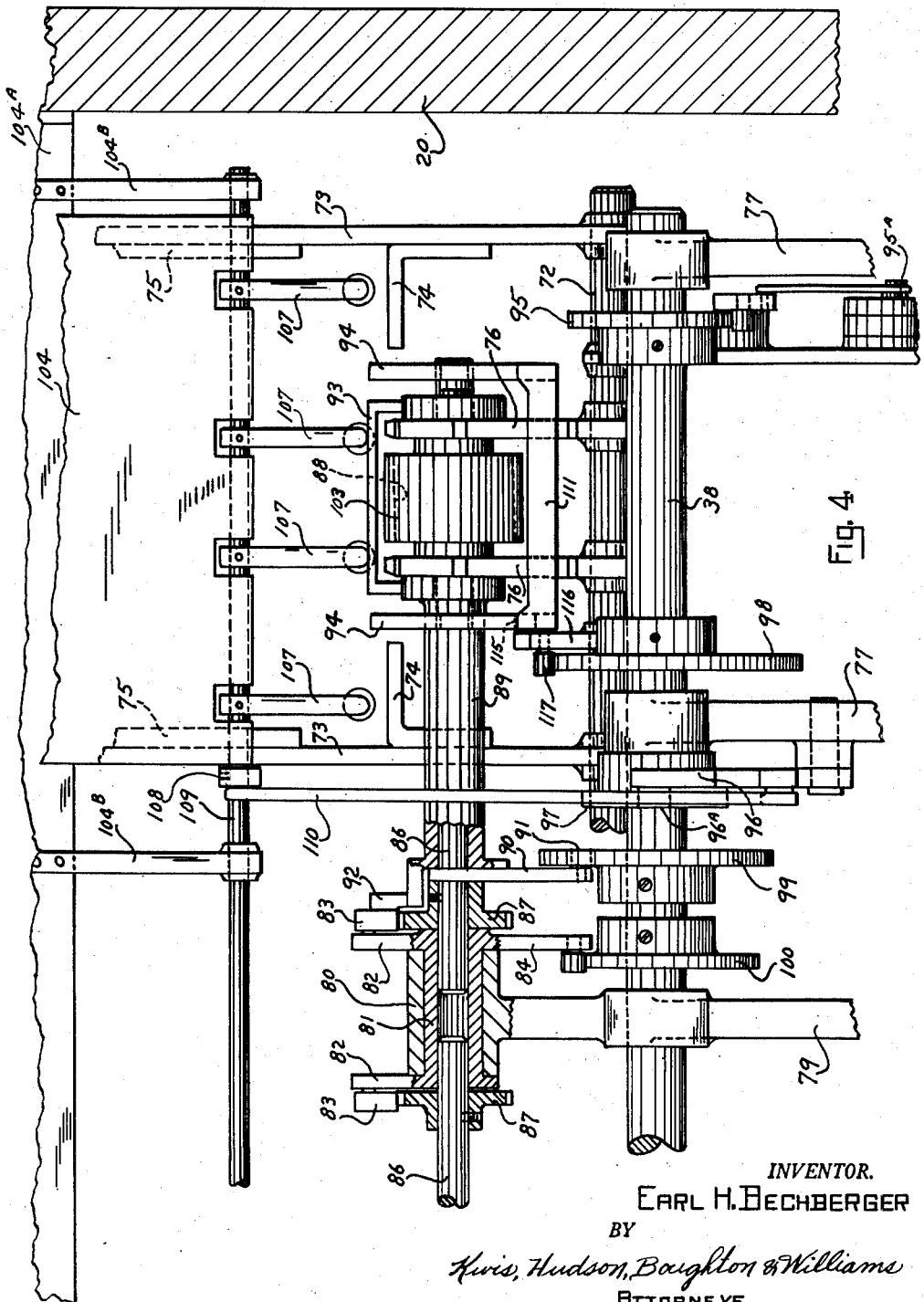

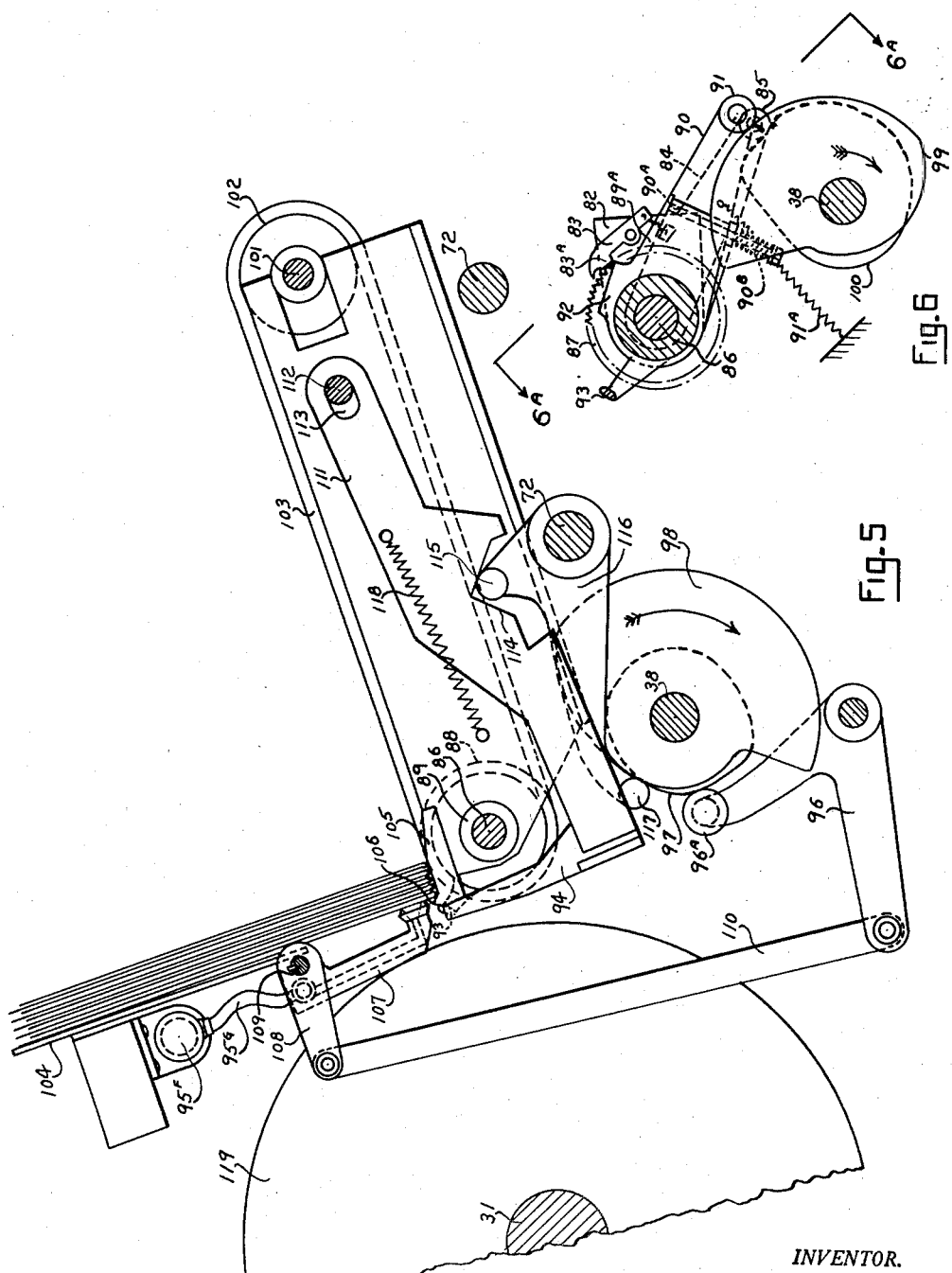

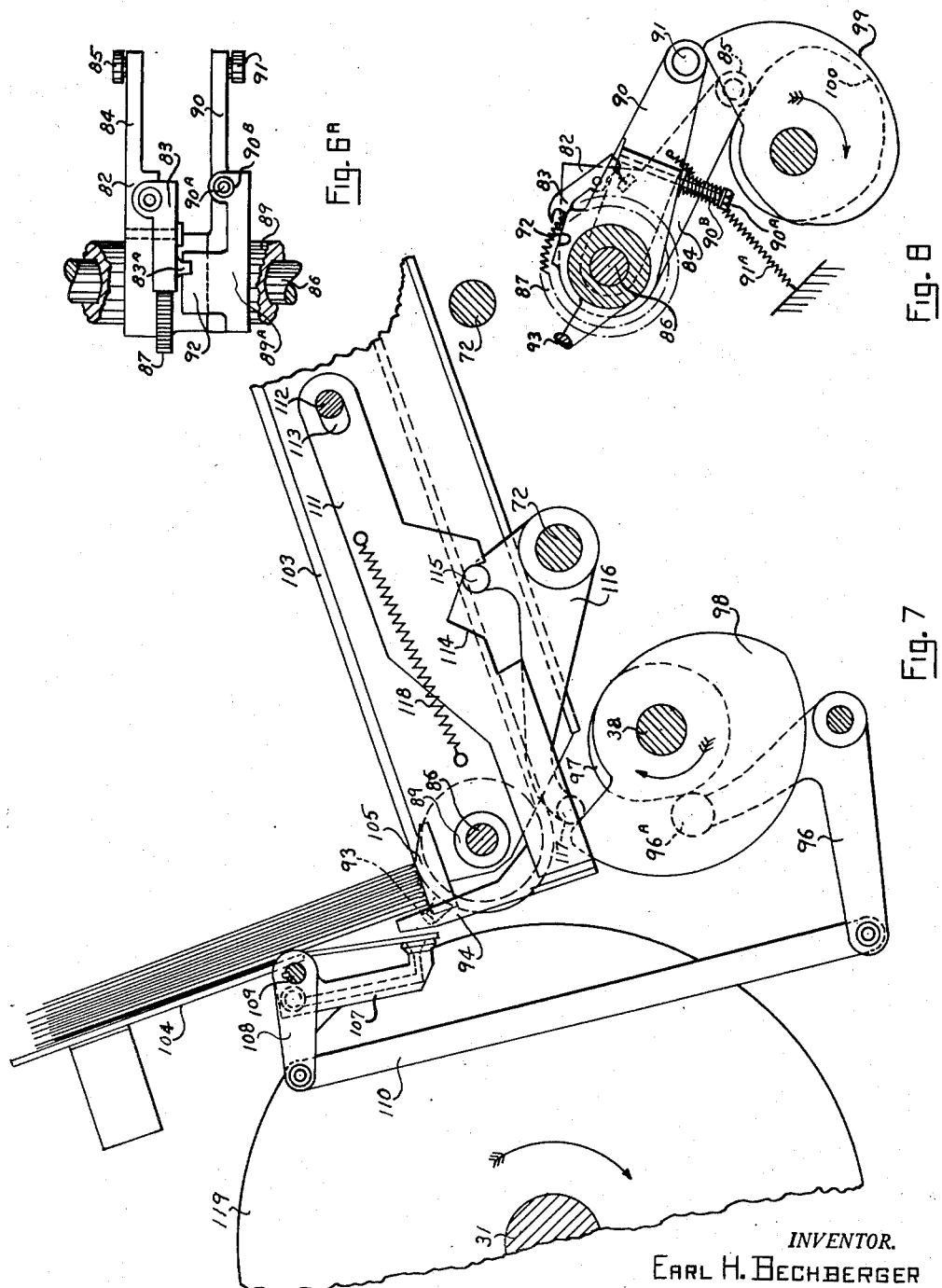

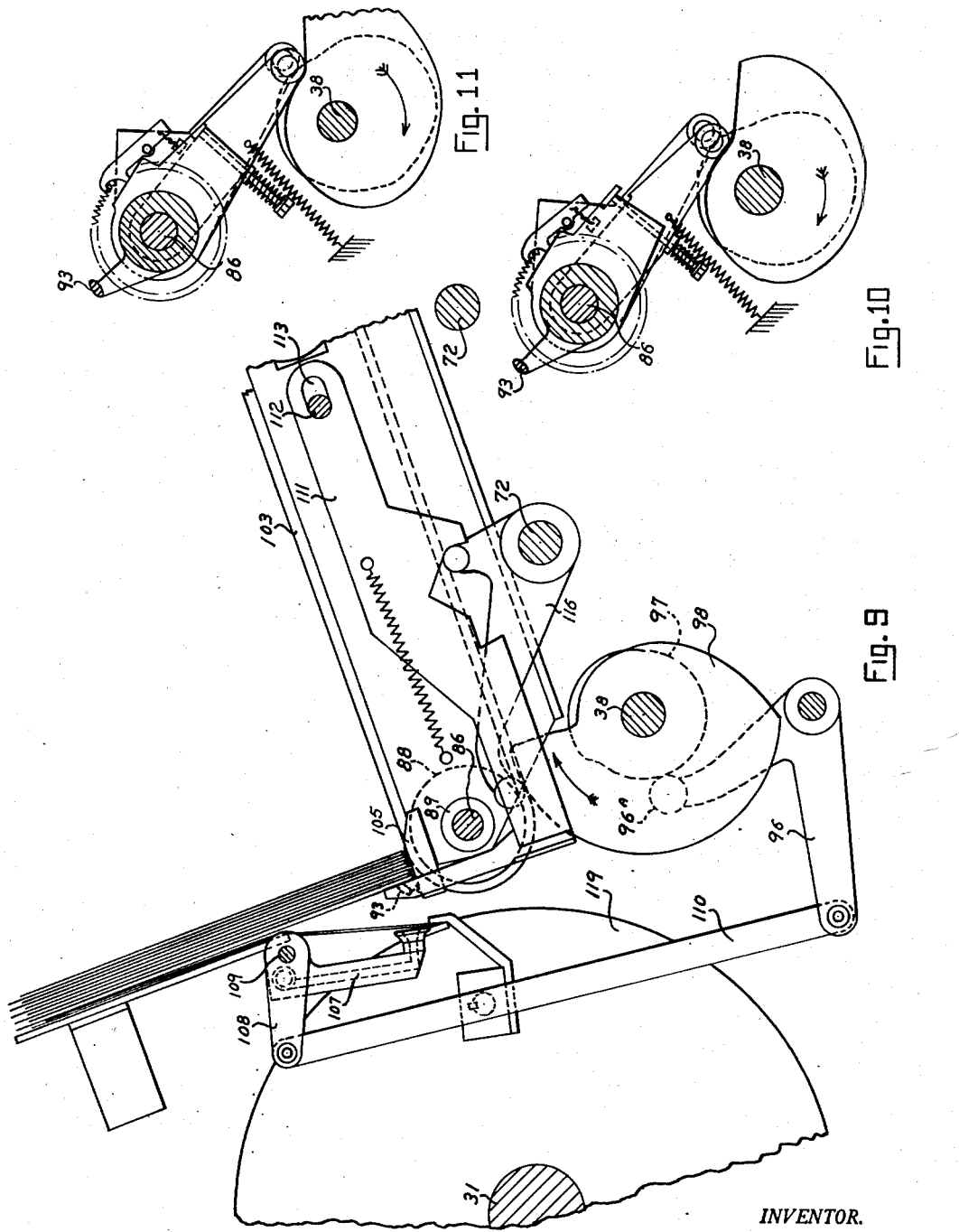

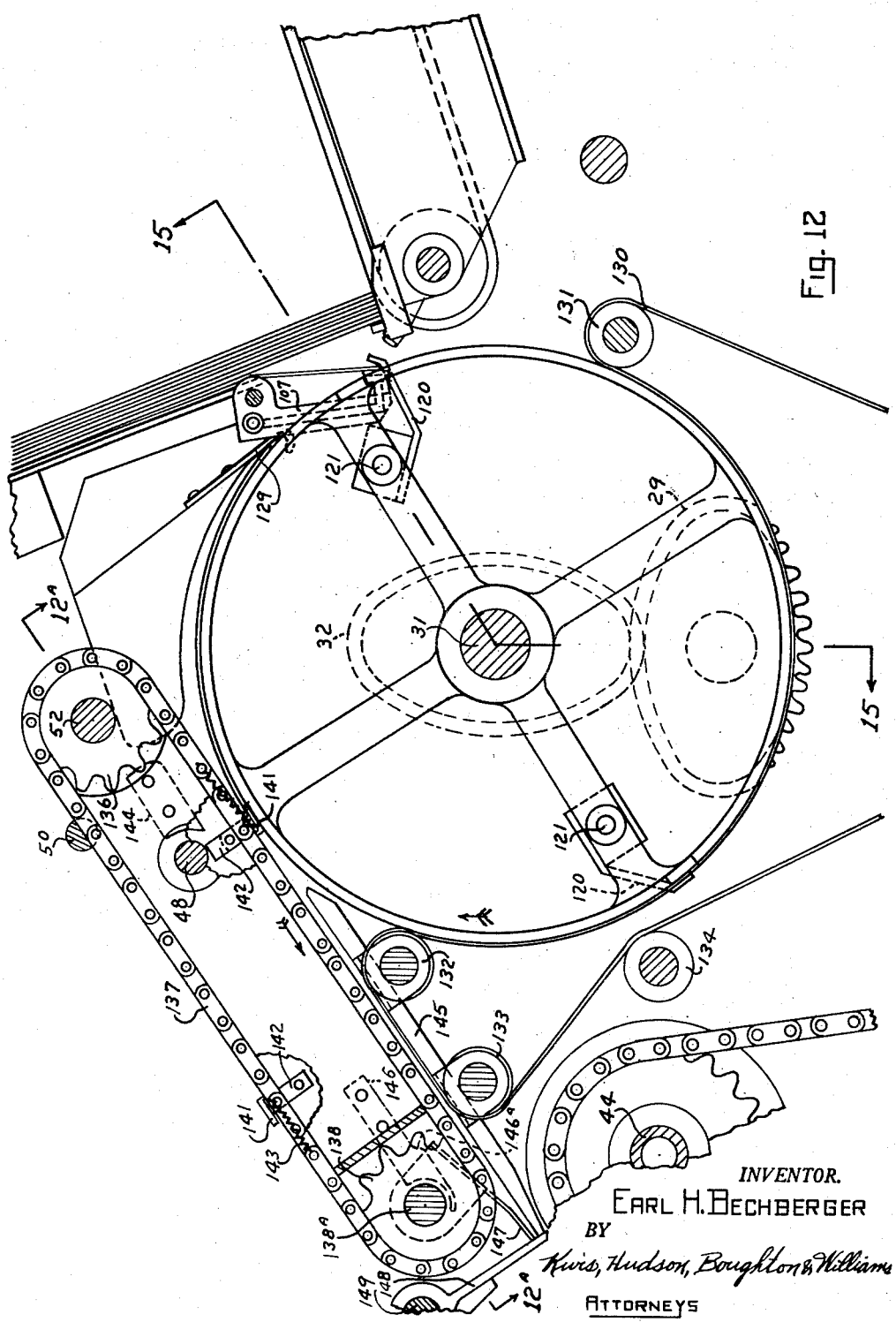

Sept. 18, 1951 E. H. BECHBERGER 2,568,604
SIGNATURE FEEDING AND TRANSFERRING MECHANISM
Filed June 6, 1946 10 Sheets-Sheet 9
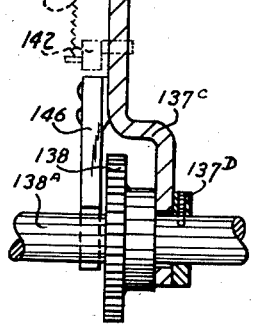
Fig.12ᴬ
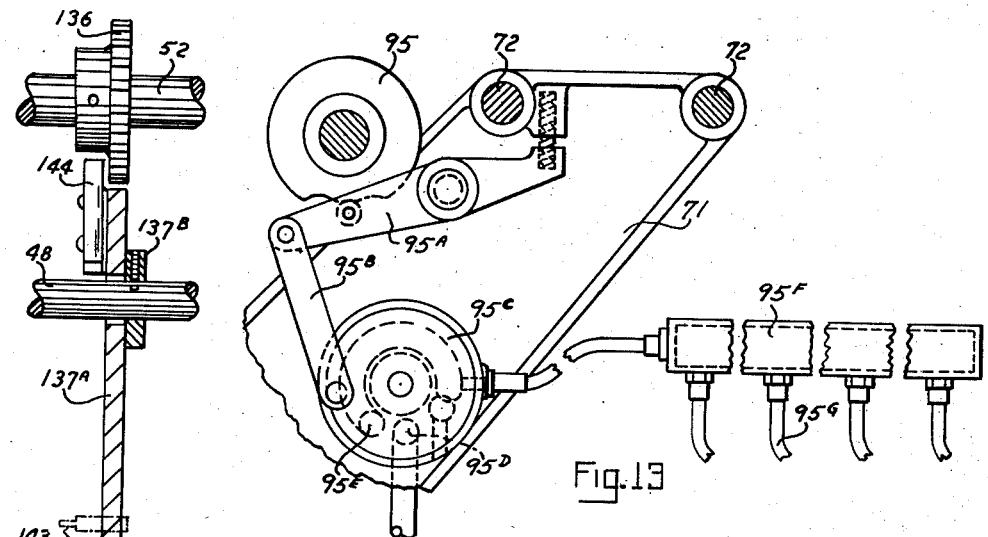
Fig.13
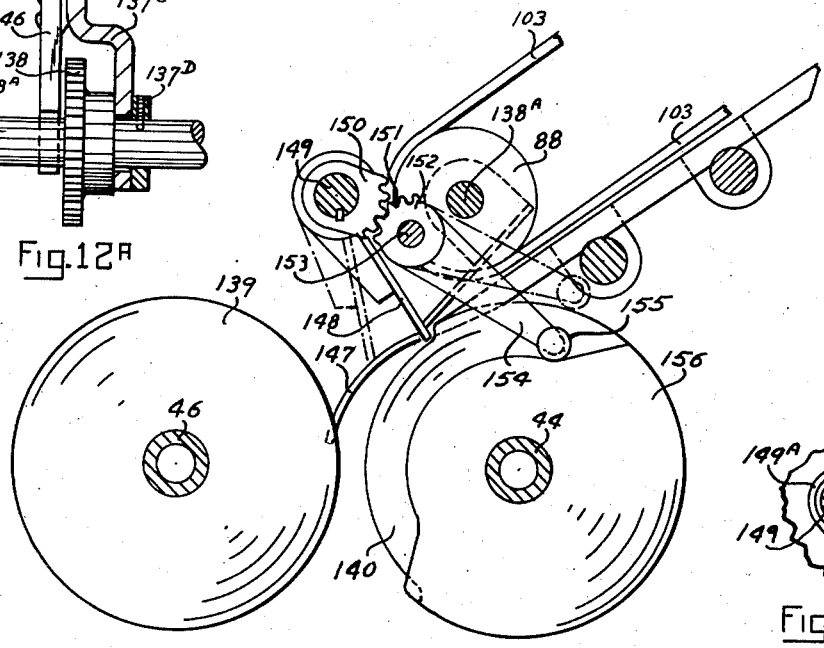
Fig.14
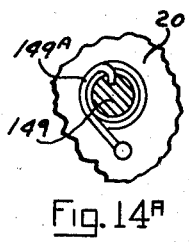
Fig.14ᴬ
INVENTOR.
EARL H. BECHBERGER
BY
Kwis, Hudson, Boughton & Williams
ATTORNEYS

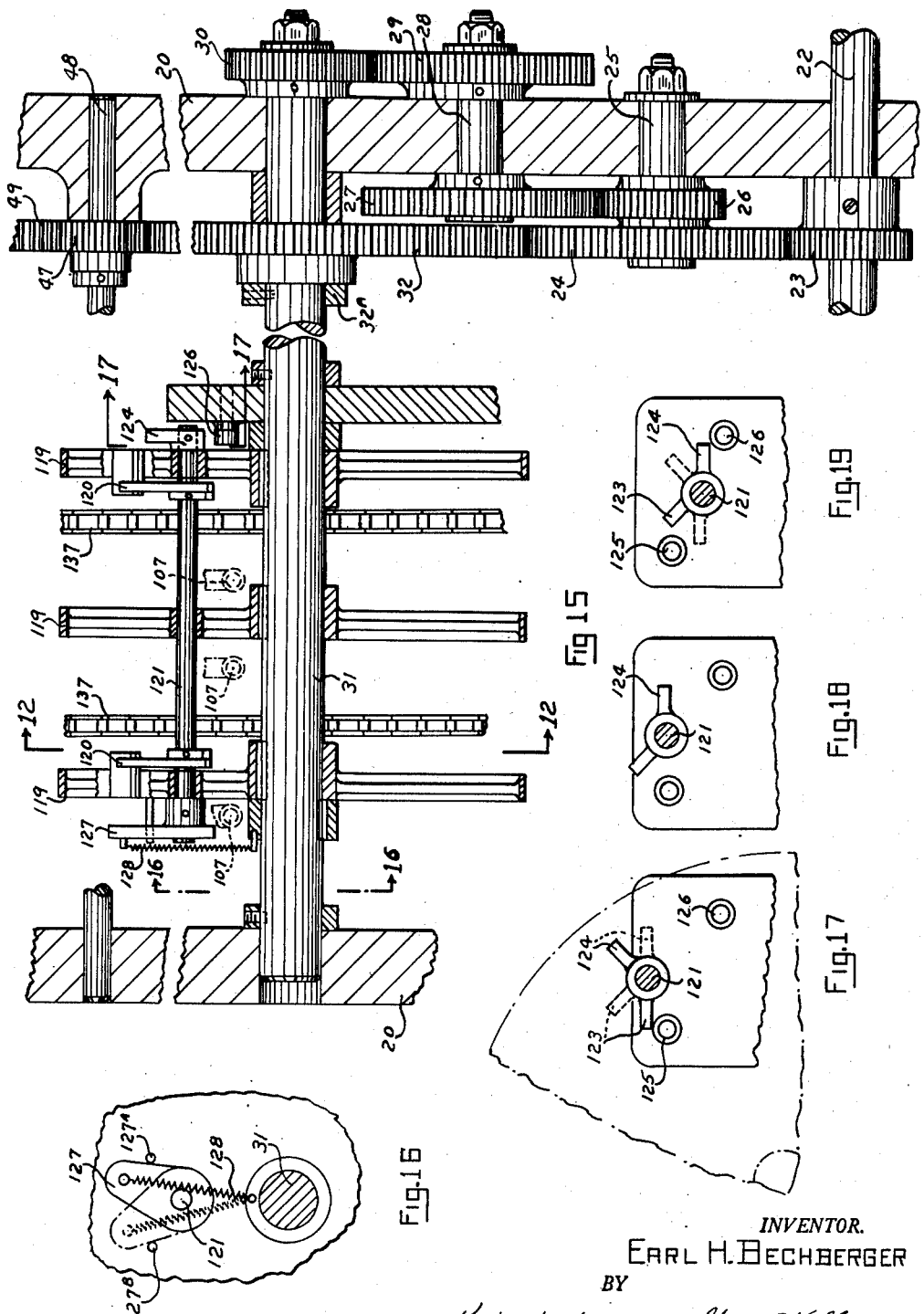

Patented Sept. 18, 1951

2,568,604

UNITED STATES PATENT OFFICE 2,568,604

SIGNATURE FEEDING AND TRANSFERRING MECHANISM

Earl H. Bechberger, Cleveland Heights, Ohio, assignor to The Warner & Swasey Company, Cleveland, Ohio, a corporation of Ohio Application June 6, 1946, Serial No. 674,754

6 Claims. (Cl. 270—54)

This invention relates to a signature collator and particularly to a signature feeding and transferring mechanism of a signature collator and wherein the signatures are fed forwardly in a supply hopper, extracted one at a time therefrom and transferred and conveyed to a point where the individual signatures are opened and deposited upon a saddle for the purpose of collating the same with the other signatures of a magazine, book or other publication.

An object of the invention is to provide an improved signature feeding, extracting, transferring and conveying mechanism of the type referred to which is rapid and positive in its operation and effects the feeding, extracting, transferring and conveying of the signatures efficiently and correctly.

A further object of the invention is to provide in a mechanism of the type referred to and in combination with the supply hopper thereof, an improved and novel feeding means together with the control for said means.

Another object of the invention is to provide an improved and novel signature extracting and transferring mechanism.

A still further object is to provide an improved and novel signature extracting and transferring mechanism wherein the extraction, transfer and conveying of the signatures is effected substantially entirely by pulling the signatures as distinguished from pushing the same, wherefore the action is positive and no bunching of the signatures can occur.

A still further object is to provide improved and novel signature extracting and transferring mechanism including a transfer drum which will carry a plurality of signatures during each drum revolution, thereby increasing the rapidity of the collating operation of the machine as a whole.

A still further object is to provide an improved and novel signature extracting and transfer mechanism which includes a transfer drum and means for driving said drum so that each revolution thereof includes decelerated and accelerated movements to permit the signatures to be properly gripped and then rapidly transferred, thereby materially increasing the efficiency and speed of operation of the mechanism.

Another object of the invention is to provide an improved and novel signature transferring and conveying mechanism with provision for squaring the signatures as they are released from the transfer drum and again squaring the signatures when they have been carried by the conveying means to a point at which they are to be opened for deposit upon the saddle.

A further object is to provide an improved and novel signature extracting and transfer mechanism wherein the signatures are released from the drum and taken by a conveyor means located above the drum, with the result that the drum can simultaneously transfer a plurality of signatures.

Further and additional objects and advantages not hereinbefore expressly referred to will become apparent hereinafter during the detailed description of an embodiment of the invention which is to follow.

Referring to the accompanying drawings illustrating said embodiment of the invention, Fig. 1 is a vertical sectional view showing diagrammatically the feeding, extracting, transferring and conveying mechanisms.

Fig. 2 is a view similar to Fig. 1, but showing by dot and dash lines the gearing in the drives to the operative parts of the mechanisms.

Fig. 3 is a sectional view through the supply hopper and the signature feeding mechanism and is taken substantially on line 3—3 of Fig. 1, looking in the direction of the arrows, and discloses the mechanism as a dual unit mechanism.

Fig. 4 is a view looking from line 4—4 of Fig. 1, with certain portions shown in section.

Fig. 5 is a detached elevational view on a larger scale of the feeding mechanism and a portion of the extracting mechanism and is taken approximately on line 5—5 of Fig. 3.

Fig. 6 is a detached partly elevational and partly sectional view of a portion of the signature feeding mechanism and is taken approximately on irregular line 6—6 of Fig. 3 looking in the direction of the arrows.

Fig. 6a is a plan view taken substantially from line 6a—6a of Fig. 6.

Fig. 7 is a view similar to Fig. 5 but showing the parts in different relationship.

Fig. 8 is a view similar to Fig. 6 but showing the parts in different relationship.

Fig. 9 is a view similar to Figs. 5 and 7 but showing the parts in a still different relationship.

Figure 1:
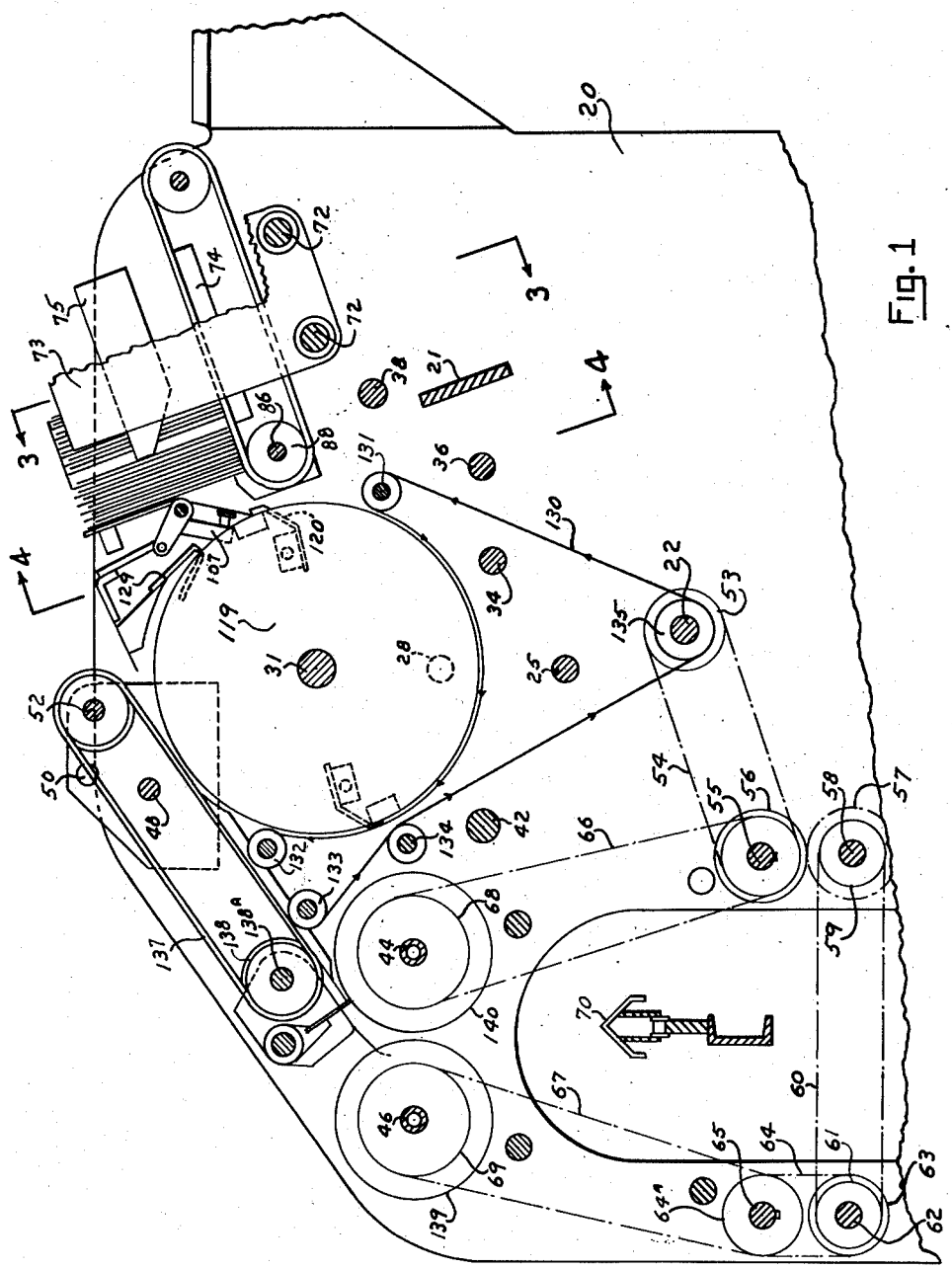

Figs. 10 and 11 are views similar to Figs. 6 and 8 but each showing the parts in different relationship from Figs. 6 and 8.

Fig. 12 is an enlarged view partly in section and partly in elevation of the extracting and transferring mechanism and of the conveyor means located above said mechanism and is taken approximately on line 12—12 of Fig. 15.

Fig. 12a is a view partly in section and partly in elevation and is taken substantially on line 12a—12a of Fig. 12.

Fig. 13 is a detached sectional view taken along line 13—13 of Fig. 3.

Fig. 14 is a detached view on a larger scale and showing the mechanism for operating the gate at the end of the conveyor means.

Fig. 14a is a detached sectional view through the gate supporting shaft.

Fig. 15 is a sectional view taken substantially on irregular line 15—15 of Fig. 12, looking in the direction of the arrows.

Fig. 16 is a detached sectional view taken on line 16—16 of Fig. 15.

Fig. 17 is a detached sectional view taken on line 17—17 of Fig. 15, and

Figs. 18 and 19 are views similar to Fig. 17 but showing the parts in different operative positions.

The signature feeding, extracting, transferring and conveying mechanism embodying the invention is illustrated herein as a dual unit mechanism and it will be understood that the units of the mechanism are identical. It will be understood that the invention contemplates mechanisms composed of one or any number of units as might be desired and that the dual unit shown herein is simply for illustrative purposes.

The mechanism comprises side supporting plates 20 which are interconnected by required cross braces, one of which is indicated in Figs. 1 and 3 at 21. Certain of the shafts of the mechanism are mounted in bearings carried by the side plates 20 while other of the shafts are mounted in bearings carried by supporting brackets fixed to the cross braces 21, see Fig. 3.

The main drive shaft is indicated at 22 in Figs. 1, 2 and 15 and said shaft is rotatably supported by the side plates 20 and is driven by a suitable power source, not shown. The main drive shaft 22 has fixed thereto a gear 23 which drives a gear 24 which, in this instance, is integral with gear 26. The gears 24 and 26 are freely rotatable on bearing shaft 25. The gear 26 meshes with a gear 27 fixed to a rotatable shaft 28. The shaft 28 also has fixed thereto an oval gear 29 which meshes with an oval gear 30 fixed to the shaft 31 which also has fixed to it the transfer drums later to be referred to. The gear 24 meshes with a large central gear 32 that is freely rotatable on the shaft 31 between a boss on plate 20 and the collars 32a and drives three gear trains now to be referred to.

One of said gear trains comprises the gear 33 which meshes with the gear 32 and is rotatable on a stub shaft 34. The gear 33 drives gear 35 rotatable on a stub shaft 36 and the gear 35, in turn, drives a gear 37 fixed to shaft 38 which carries cams later to be referred to. The gear train just described may be designated as the signature feeding and separating gear train. The second gear train driven by the central gear train 32 comprises the gear 41 rotatable on stub shaft 42 and driving gear 43 fixed to a hollow shaft 44, with said gear 43 driving gear 45 fixed to a hollow shaft 46. The second gear train may be designated as the signature opening gear train. The third gear train driven by the central gear 32 comprises the gear 47 rotatable on fixed shaft 48 and driving a gear 49 rotatable on stub shaft 50, with the gear 49, in turn, driving gear 51 fixed to shaft 52. The third gear train may be designated as the conveyor gear train.

The main drive shaft 22 is provided also with a sprocket 53 fixed thereto and which drives a chain 54 extending around a sprocket fixed to a shaft 55, see Fig. 1. The shaft 55 also has fixed thereto a gear 56 which meshes with a gear 57 rotatable on stub shaft 58 and having fixed thereto a sprocket 59 that drives a chain 60 which extends around a sprocket 61 rotatable on a stub shaft 62 and which sprocket 61 has fixed thereto a second sprocket 63 which drives a chain 64 that extends around a sprocket 64a fixed on a shaft 65. The shafts 55 and 65 both have axially spaced sprockets fixed thereto which drive pairs of signature opening and lowering chains 66 and 67, respectively, that extend around sprockets 68 and 69 freely rotatable on shafts 44 and 46. The shafts 44 and 46 have fixed thereto signature opening rollers 140 and 139 which with the chains 66 and 67 and the drive thereto constitute the subject matter of Spisak Patent No. 2,507,281, issued May 9, 1950.

It will be understood that the signatures after they leave the conveying means, later to be described in detail, are opened by the opening rollers 139 and 140 and the chains 66 and 67 and are deposited by the latter on the saddle 70. The hopper and feeding mechanism will now be described.

The cross brace 21 between the side walls 20 has secured thereto on one of its sides upstanding bracket arms 71, see Figs. 3 and 13. The upper ends of the bracket arms 71 are provided with spaced bosses which receive and have fixedly mounted therein supporting bars 72 which extend from adjacent one side plate 20 to adjacent the other side plate 20. The hopper of each unit is supported by the bars 72 and comprises upwardly extending spaced parallel side members 73, the lower ends of which are rigidly connected to said bars, see Fig. 3. The members 73 of the hopper have secured to their inner sides angle bars 74 which extend longitudinally of the hopper and the upper surfaces of their horizontal arms support the lower edges of the signatures placed in the hopper. The members 73 also have secured to their inner sides gauges 75 which terminate a substantial distance rearwardly of the discharge end of the hopper, see Fig. 1, and which gauges are well understood in the art. The bars 72 also support a pair of parallel bearing plates 76 which are located midway of the side members 73 and the angle bars 74. The cross brace 21 also has secured to it upstanding brackets 77 provided at their upper ends with bearing bosses for the cam shaft 38. Also secured to the cross brace 21 midway of the side plates 20 is a longer upstanding bracket 79 which is provided with a bearing boss for the cam shaft 38 and extends beyond said boss and has at its free end a second bearing boss 80. A sleeve 81 is rockably carried by the boss 80 and at its opposite ends is provided with arms 82 which mount pawls 83. The sleeve 81 is also provided with a downwardly extending arm 84 the free end of which is provided with a roller 85 that cooperates with a cam, later to be referred to, and carried by the cam shaft 38. Shafts 86 are associated with each hopper and said shafts have their adjacent ends individually rotatably supported in the sleeve 81 and each has fixed thereto adjacent the end of said sleeve 81 a ratchet wheel 87 that cooperates with a pawl 83. The opposite ends of the shafts 86 are rotatably supported by the bearing plates 76 and intermediate said bearing plates have pulleys 88 fixed to the shafts. Each shaft 86 rockably supports an elongated sleeve 89 between the ratchet wheel 87 and the plates 76 and which is provided at one end with a downwardly extending arm 90 carrying a roller 91 that cooperates with a cam on the cam shaft 38 and later to be referred to.

The sleeve 89 and the arm 90 are pivotally interconnected and the sleeve has a portion 89a overlying the arm. A pin 90a is carried by said portion and extends through the arm, see Fig. 6. A spring 90b carried by the pin normally acts to prevent relative movement between the sleeve and arm. A spring 91a connected to the frame and the arm and stronger than spring 90b, maintains the roller 91 in contact with the cam. Each sleeve 89 adjacent said one end is provided on its circumference with a cam 92 later to be described in more detail and which functions to render the pawl 83 active or inactive. The sleeves at their opposite ends are each provided with a feeler 93 which has movement toward and away from the signatures in the hopper and functions as a controlling element for feed regulation. Arranged on each side of each feeler 93 are pusher arms 94 that are operated by cams carried by the cam shaft 38.

As already explained, the shaft 38 has fixed thereto a gear 37, see Fig. 3, which forms part of the signature feeding and extracting gear train and thus the cam shaft 38 is driven from the main drive shaft 22.

The cam shaft 38 is provided with two double sets of cams with one set for each unit of the mechanism. In addition, said shaft has a single pawl actuating cam which functions for both units. It will only be necessary to explain the cams in connection which a single unit.

The shaft 38 has fixed thereto a cam 95 which engages a roller carried by a rockable lever 95a. The free end of lever 95a is pivotally connected to one end of a link 95b, the other end of said link being pivotally connected to the rotatable disk of a disk type suction control valve 95c. When the roller of the lever 95a is on the high point of the cam 95 the rotatable disk of the valve 95a will have been rocked to bring the inlet port 95d into registry with the outlet port 95e. The inlet port 95d is connected to a source of suction while the outlet port 95e is connected to the manifold cylinder 95f which, in turn, is connected by flexible tubes 95g to suction arms 107 later to be described. When the roller is on the low spots of the cam 95 the parts are returned by spring pressure to the position shown in Fig. 13 to disconnect the suction and at such time the port 95e and manifold 95f are connected to atmosphere.

In addition to the cam 95 the shaft 38 is also provided with a cam 97 for the bell crank 96 which is connected to the suction arm rod and with a cam 98 for operating the pusher arms 94. The shaft 38 is also provided with a cam 99 for rocking the sleeve 89 and in turn the feeler 93. In addition to the cams just refered to, the shaft 38 has fixed thereto a cam 100 which rocks the sleeve 81 that carries the pawl supporting arms 82, it being recalled that said arms are carried by the sleeve 81 at both ends thereof.

The hopper at its rear or right hand end, as viewed in Fig. 5, is provided with a shaft 101 parallel to the shaft 86 and carrying an idler pulley 102. An endless feed belt 103 extends around the pulleys 88 and 102 and the upper surface of the upper reach of the belt 103 lies substantially in the same plane as the upper surface of the horizontal arms of the angle bars 74, see Figs. 3 and 4, wherefore when signatures are stacked in the hopper with their folded edges downward said edges will be supported by the upper reach of the belt 103 and partially by the angle bars 76, and hence when the belt 103 is moved in a counterclockwise direction as viewed in Fig. 5 the signatures will be moved forwardly in the hopper. The gauge members 75 cause the signatures toward the rear of the hopper to be bowed as is well known in the art and it will be noted that the gauges 75 terminate short of the front plate 104 of the hopper, see Fig. 1, wherefore a group of the signatures which have been moved forwardly beyond the forward end of the gauge members have straightened out from their bowed condition and the foremost signture is in engagement with the front plate 104. The foremost signature in the hopper has its lower folded edge resting upon the upper edge of members 105 that are provided with upstanding beveled stops 106 engaged by the foremost signature and over which stops the lower edge of the signature must be pulled by the suction arms now to be described.

The foremost signature in the hopper is adapted to be engaged by the suction cup carried at the lower end of rocking suction arms 107 and when said arms rock in a clockwise direction as viewed in Fig. 5 by mechanism later to be described the folded lower edge of the foremost signature is pulled over the tapered stops 106 and the lower end of the signature is bent about the lower edge of the plate 104 outwardly toward the transfer drum later to be described. The suction arms 107 are fixed to a rod 109 which is rockably supported at the lower end of the plate 104 on bracket arms 104b caried by frame plate 104a. One end of a lever 108 is fixed to the rod 109 and the other end of said lever is pivotally connected to one end of a link 110, the opposite end of which is pivotally connected to the suction arm operating bell crank lever 96.

When the suction arms have swung outwardly to bend the lower edge of the foremost signature from the position shown in Fig. 5 into the position shown in Fig. 9, then the signatures remaining in the forward portion of the hopper will be pushed rearwardly by the pusher arms 94 in order to separate the foremost signature from the signatures immediately behind it. Also at this time the feeler 93 moves until it contacts signatures that were pushed rearwardly by the pusher arms, whereupon the feeler stops for the purpose of controlling the movement of the feed belt 103. These functions of the pusher arms and the feeler will now be described in greater detail.

The pusher arms 94 are interconnected with each other and with an actuating bar 111, said bar being pivotally mounted at its right hand end as viewed in Fig. 5 on a pin 112 carried by the hopper and projecting through an elongated slot 113 formed in the bar 111, wherefore said bar can have both pivotal and sliding movement with respect to said pin. The lower edge of the bar 111 is provided with a camming recess 114 and the edge of said recess is contacted by a roller 115 carried by one arm of a bell crank lever 116 that is rockably mounted on the supporting bar 72. The other arm of the bell crank lever 116 carries a roller 117 which rides on the periphery of the cam 98. A spring 118 is connected to the actuating bar 111 and to the hopper and acts normally to hold the bar in the position shown in Fig. 5 at which time the pin 112 is at the right hand end of the slot 113. When the shaft 38 rotates in a clockwise direction from the position shown in Fig. 5 toward the position shown in Fig. 7 the bell crank 116 on the bar 72 is rocked by the cam 98 and the roller 115 acts on the bar 111 to move the latter in an upward direction and into the position shown in Fig. 7, at which time the pusher arms are elevated and extend between the foremost signature which has been outwardly bent by the suction arms and the remaining signatures in the hopper. The continued clockwise rotation of the shaft 38 and cam 98 from the position of Fig. 7 to the position of Fig. 9 acts through the bell crank lever 116 to shift the actuating bar 111 rearwardly of the hopper until the pin 112 is at the most left hand point of the slot 113 and during this time the pusher arms act to push the lower portion of the remaining signatures rearwardly in the hopper to free the remaining signatures from the foremost signature.

Slightly behind the pushing movement of the pusher arms, as just described, the feeler 93 is moved from the position shown in Figs. 5 and 6 through the position shown in Figs. 7 and 8 to the position shown in Figs. 9 and 10, and if maximum feed is required, to the position shown in Fig. 11. The rotation of the shaft 38 and cam 99 from the position shown in Figs. 5 and 6 to the position shown in Figs. 7 and 8 causes the arm 90 and the sleeve 89 to rock as a unit in a clockwise direction under the action of the spring 91a, with the result that the feeler 93 follows the movement of the pusher arms toward the rear of the hopper. Simultaneously with this unitary clockwise rocking movement of the sleeve 89 and arm 90 a slight counterclockwise rocking movement is imparted to the arm 84 by the cam 100 and in turn to the pawl carrying arm 82, with the result that the pawl pin 83a moves from the high point of the cam 92 toward the low point thereof and the pawl 83 rocks under the action of its spring in a ratchet engaging direction. The continuation of the clockwise rotation of the shaft 38 and the cams 99 and 100 causes the feeler 93 to move slightly farther in a clockwise direction until it engages the leading signature of the group of signatures which have been pushed rearwardly by the pusher arms. This further rotation of the cams 99 and 100, in addition, causes a slight further clockwise movement of the feeler 93 and cam 92 and a further counterclockwise rocking of the arms 84 and 82, with the result that the pawl 83 rides down the cam 92 and into contact with the ratchet 87 and rotates the latter a slight distance until roller 85 reaches the highest point of cam 100, thus effecting movement of the belt 103 to cause a slight forward feeding movement to the signatures in the hopper. This feeding movement normally is the equivalent of the thickness of one signature. The further clockwise rotation of the cam 99 after the feeler 93 has engaged the leading signature simply causes the arm 90 to rock relative to the sleeve 89 and feeler 93 to compress the spring 90b with the roller 91 following the contour of the cam under the action of the stronger spring 91a. However when the feeler 93 is in the position shown in Figs. 9 and 10 and does not contact the leading signature, due to signatures not being in their normal forward position, then the further rocking of the arm 90 also rocks the sleeve 89 and the feeler 93 until the latter does engage the leading signature or has reached its maximum point of movement. Under these conditions the rocking of the arm 84 by the cam 100 causes the pawl 83 to impart greater feeding movement or its maximum feeding movement to the ratchet 87 and to the belt 103. It will be understood that the continued clockwise rotation of the cams 97, 99 and 100 causes the pusher arms 94 and the feeler 93 and the pawl 83 to be restored to their original and inactive positions. It will be understood that simultaneously with the rocking of the suction arms 107 to bend the lower edge of the foremost signature, as has just been explained, the cam 95 on the shaft 38 causes opening of the suction control valve 95c to cause the suction in the cups of the suction arms 107 to attract and hold against the latter the lower end of the foremost signature.

When the suction arms have been swung to their most outward position, see Fig. 9, the lower end of the signature is located adjacent to the circumference of the extracting and transfer drum 119 which is rotating in a clockwise direction, wherefore the lower end of the signature can be gripped by grippers 120 carried by the drum as will later be explained, with the result that the signature is withdrawn completely from the hopper in a downward direction and is carried around in contact with the surface of the drum and in a clockwise direction. Simultaneously with the gripping of the lower end of the signature by the grippers 120 the cam 95 on the shaft 38 effects closing of the suction control valve 95c, wherefore the suction cups of the arms 107 release the signature.

The extracting and transfer drum 119 is formed of three wheels keyed to and spaced axially of the shaft 31, thus providing space between the wheels in which the suction arms and grippers can function.

The extracting and transfer drum 119 is illustrated as provided with two sets of two grippers 120 each with said sets spaced substantially 180° apart. Consequently two signatures can be carried by the drums simultaneously but it will be understood that with larger diameter drums the number of sets of grippers can be varied as well as the number of signatures carried simultaneously by the drum. In this instance the wheels of the drum 119 rockably support a pair of shafts 121 which extend longitudinally through the drum and project at their opposite ends outwardly of the drum. Each shaft 121 has fixed to it to rock therewith a pair of grippers 120 located adjacent the inner sides of the outer wheels. The shafts 121 on one of their projecting ends have fixed thereto gripper actuating members including the angularly spaced arms 123 and 124, see Figs. 15 and 17. The arms 123 and 124 as the drum rotates cooperate with fixed rollers 125 and 126 located exteriorly of the drum and supported by a fixed part of the machine, see Fig. 15. The opposite ends of the shafts 121 exteriorly of the drum have fixed thereto levers 127 and extension springs 128 are connected to said levers adjacent the free ends thereof and to a collar keyed to the shaft 31.

Referring to Fig. 12, the left hand set of grippers 120 is shown in the closed or gripping position and it will be seen that as the drum 119 rotates in a clockwise direction as indicated by dot and dash lines in Fig. 17, that first the arm 123 correlated to this set of grippers will engage the roller 125 to initiate rocking movement of the shaft 121 and grippers 120 from gripping or closed position toward open or non-gripping position. The initial movement of the grippers and the lever 127 with the shaft 121 extends the spring 128 until it has passed the point of maximum extension, whereupon said spring functions with a snap action to move the lever 127 to the full line position of Fig. 16 and to continue the opening movement of the grippers into the fully opened position indicated by the right hand set of grippers in Fig. 12 and by the positions of the arms 123 and 124 in Fig. 18. The clockwise rotation of the drum 119 continuing the arm 124 of the now right hand and opened set of grippers engages the stationary roller 126, see Fig. 19, and the movement of the grippers toward gripping position is initiated by this engagement. Again the rocking of the lever 127 in a counterclockwise direction extends the spring 128 and as soon as the lever has passed the point of maximum extension of said spring the latter again functions with a snap action to continue the counterclockwise movement of the lever 127, shaft 121 and the grippers 120 until they reach fully closed or gripping position as indicated by the left hand set of grippers in Fig. 12, at which time the arms 123 and 124 are in positions shown in full lines in Fig. 17.

The signatures gripped to the transfer drum are carried around by the rotation of the drum until the leading signature is positioned in and engages the fixed V stops 129 supported by the frame of the machine and located in the circumference of the drum, at which time the grippers are opened as just explained to release this signature.

It will be noted by reference to Fig. 12 that during the period between the release of the signature in the V stops 129 and the gripping of a new signature by the grippers, the drum 119 will be rotated at a relatively slow speed since the teeth of the driving oval gear 29 at the short pitch radius are driving the teeth of the driven oval gear 32 at the long pitch radius. After the grippers have gripped the new signature the rotation of the drum is accelerated until the driving gear 29 is operating on a long pitch radius and the driven gear 32 on a short pitch radius and then is decelerated as the other set of grippers come to signature releasing position, whereupon the drum will again rotate at relatively slow speed during the release of one signature and the gripping of a new signature. In other words, each rotation of the drum includes two periods of relatively slow rotation during which a signature is released and a new signature is gripped and two periods of relatively accelerated rotation during which the signatures are being transferred by the drum. Therefore it will be seen that not only does the transfer drum simultaneously transfer a plurality of signatures but that such transfer is effected rapidly and in a minimum amount of time.

As each signature is gripped by the grippers 120 it is carried in a clockwise direction by the drum and is held in contact with the circumference of the drum by a belt 130 which hugs the circumference of the drum between the pulleys 131 and 132, see Fig. 1. The belt 130 passes around the pulley 132, around pulley 133, and over guide pulley 134 and around the driving pulley 135 fixed on the main drive shaft 22. The belt 130 thus acts to maintain the signatures in contact with the periphery of the drum until they have reached a point where they will remain in contact by gravity. The portion of the belt 130 between the pulleys 132 and 133 performs a function later to be explained and cooperates with the conveyor means which will now be described.

The shaft 52 driven from the central gear 32 by the gears 47, 49 and 51 has fixed to it axially spaced driving sprockets 136 for endless conveyor chains 137 which extend around said sprockets 136 and around idler sprockets 138 located above and adjacent to the signature open-ing rolls 139 and 140 which need not be explained in detail herein as they are fully illustrated and described in said Spisak Patent No. 2,507,281.

The fixed shaft 48 supports plates 137a located within the chains 137 which ride upon the edges of the plates as supporting guides for the straight portions of the chains. Each plate 137a is secured to a collar 137b fixed on shaft 48 and each plate also has an offset portion 137c extending past one side face of the sprocket 138 and having a collar 137d secured to it and fixed on the stationary shaft 138a. The chains 137 are each provided in this instance with two grippers 141 which are pivoted to one side of the chain and have actuating arms 142 extending inwardly along side of the plate 137a. The grippers 141 are maintained in gripping position by springs 143. As the chains travel around the sprockets 136 and 138 the actuating arms 142 of the grippers contact and are rocked by a stationary cam plate 144 carried by the plate 137a and located adjacent to the sprockets 136, wherefore the grippers are opened against the action of the springs 143 and are held open so long as the arms 142 are in engagement with the cam plate 144. The instant that the arms 142 pass out of contact with the cam plate 144 then the grippers 141 immediately move to gripping position under the action of the springs 143 and grip the open edges of the signature which is resting in the V stop 129, and the further movement of the chains causes the grippers to pull the signature from the transfer drum and into the space between the lower reach of the chains and supporting bars 145. The signatures are thus moved by the chains toward the sprocket 138 and in so moving pass between the lower reach of the chains and that portion of the endless belt 130 which is intermediate the pulleys 132 and 133. While the signature is still in engagement with said portion of the belt 130 the actuating arms 142 contact the raised heel 146a of the cam plates 146 which are secured to the plates 137a and are located near the sprockets 138 and the grippers are thus opened and the signature released. The belt 130, however, continues to move the signature forwardly beneath the guide 147 and against the normally closed gate 148, the action of the belt on the signature after it has engaged the gate acting to square the signature into the proper position for opening by the opening rolls 139 and 140.

The gate 148 is fixed to a rotatable shaft 149 supported by the end plates 20 and which has fixed thereto near one end a gear segment 150 meshing with a gear segment 151 formed on a sleeve 152 that is rockably mounted on a sub shaft 153, see Fig. 14. The sleeve 152 carries an arm 154 provided at its free end with a roller 155 that is maintained in contact with the periphery of a cam 156 fixed to the shaft 44 by suitable spring means such as a rat trap spring 149a or shaft 149, see Fig. 14a. Hence as the cam 156 rotates the arm 154 is rocked and through the gear segments 151 and 150 the shaft 149 is similarly rocked to momentarily swing the gate 148 from its normally closed position to its open position. When the gate is opened the belt 130 moves the signature forwardly and its advancing forward open edges are bent by the extension of the guide 147 into a position where the edges can be gripped by grippers on the opening rolls 139 and 140. It will be understood that after the open edges of the signature have been gripped by the grippers on the opening rolls the signature is carried downwardly by the rotation of said rolls and partially opened and is then gripped by grippers on the chains 67 and 68 and is positively moved downwardly and spread to open position until it is deposited on the saddle conveyor 70 fully explained and covered in said Spisak Patent No. 2,507,281.

In order to coordinate the description hereinbefore set forth and to clearly bring out the functions of the various parts as well as to explain the advantages existing in the construction and the manner in which it accomplishes the objects specified, a description of the operation of the mechanism is now in order. It will be assumed that a supply of signatures is in the hopper with the closed or folded ends of the signatures resting upon the angle bars 74 and upon the feed belt 103 while the long open edge of each signature is toward the front of the hopper. It will also be assumed that the signatures lying between the gauges 75 are bowed, as will be understood, for the purpose of stiffening the signatures and that a group of the signatures in straightened form is located forwardly of the gauges 75, with the foremost signature in engagement with the front plate 104. It will also be assumed that the suction arms 107 are in the withdrawn position of Fig. 1 and that the pusher arms 94 and the feeler 93 are in the normally inactive position of Fig. 5. Assuming that power is now applied to the main drive shaft 22, it will be understood that the signature feeding and separating gear train, the signature conveying gear train and the signature opening gear train start to be driven and that the cam carrying shaft 38 starts rotating as does also the transfer drum 119. Therefore the cam 97 rocks the bell crank actuating lever 96 to cause the suction arms 107 to be swung from the position shown in Fig. 1 inwardly until the suction cups are contacting the foremost signature as shown in Fig. 5. At this time the cam 95 has actuated the suction control valve to open position, wherefore the lower end of the foremost signature is held against the cups by suction. The cam 97 now rocks the bell crank 96 to cause the suction arms 107 to swing outwardly and to pull the folded lower edge of the foremost signature over the beveled stops 106 and to bend the lower portion of the foremost signature outwardly about the lower edge of the plate 104. When the outward movement of the suction arms 107 has reached the position indicated in Fig. 7 the cam 98 operating on bell crank 116 has raised the pusher arms 94 from the position shown in Fig. 5 upwardly behind the outwardly bent signature to the position shown in Fig. 7. Also during this time the cam 99 operating on the arm 90 has rocked the feeler 93 from the position shown in Fig. 6 to the position shown in Fig. 8. The cam 97 continues to effect the outward swinging movement of the suction arms 107 from the position shown in Fig. 7 to the position shown in Fig. 9, at which time the lower end of the bent foremost signature is contacting the periphery of the transfer drum 119. Simultaneously with this outward swinging of the suction arms the cam 98 has effected rearward movement of the elevated pusher arms 94 from the position shown in Fig. 7 to the position shown in Fig. 9 and the straightened signatures located forwardly of the side gauges 75 have been pushed rearwardly as a group and are compacted by such movement. Also the rearward pushing of the remaining straightened signatures by the pusher arms frees said signatures from the now bent foremost signature. The cam 99 during this time has continued to effect movement of the feeler 93 rearwardly and following the rearward movement of the pusher arms until the feeler engages the leading signature of those compacted by the pusher arms, whereupon the rearward movement of the feeler stops. The said rearward movement of the feeler has caused the cam 92 to move from the position shown in Fig. 8 wherein the pawl was just about to engage with the ratchet teeth to the position shown in Fig. 10 wherein the pawl 83 is fully engaged with the ratchet teeth. Therefore the rocking of the arm 84 by the cam 100 results in the pawl rotating the ratchet 87 to impart a forward feeding movement to the belt 103 and normally this feeding movement is the distance equivalent to the thickness of one signature. Under normal operations and after the feeler 93 has contacted the leading signature, as just explained, the further rocking of the arm 90 by the cam 99 under the action of the spring 91a results in the arm 90 moving relative to the sleeve 89 and compressing the spring 90b. However, in the event that the signatures previously have not come forward properly under the feeding action just explained, the feeler 93 may have to travel rearwardly a further distance from the position shown in Fig. 10 toward the position shown in Fig. 11 and until it contacts the leading signature, and under such circumstances the cam 92 is moved farther in a clockwise direction and therefore the pawl 83 more quickly engages with the ratchet teeth and a feeding movement in excess of the normal thickness of one signature is imparted to the belt 103. It will thus be seen that the position of the signatures in the hopper controls the amount of forward feeding movement imparted to the signatures so that the signatures will be maintained in proper position to be withdrawn from the hopper.

As already stated, the suction arms 107 have bent the lower portion of the foremost signature into contact with the circumference of the transfer drum 119. At this time the pusher arms and the feeler are returned to their normal positions indicated in Fig. 5 by the further rotation of the cams 97 and 99. At this time the transfer drum 119 is rotating at decelerated speed due to the action of the oval gears 29 and 32 and the grippers 120 have been opened by the engagement of the arm 123 with the stop 125 and by the snap action of the spring 128 and hence the lower end of the bent foremost signature is in a position to be engaged and held by the grippers when the latter are closed. The continued slow rotation of the transfer drum causes the pin 124 to engage the stop 126 and initiate the closing movement of the grippers, which movement is completed by the snap action of the spring 127 and therefore the lower end of the bent foremost signature is now held positively by the grippers in contact with the periphery of the drum as indicated in Fig. 9. Simultaneously the cam 95 on the shaft 38 actuates the suction control valve to relieve the suction and hence the suction cups carried by the suction arms 107 release their engagement with the signature. The continued clockwise rotation of the transfer drum 119 positively pulls the foremost signature gripped thereto downwardly and out of the hopper and around between the drum and the belt 130. The signature is now pulled around by the drum at an accelerated rate of movement due to the action of the oval gears 29 and 32 until the other set of grippers carried by the drum approaches the position wherein they are to be opened and then closed to grip another signature, the lower end of which has been positioned by the suction arms 107 against the periphery of the drum in the manner described. At this time the rotation of the transfer drum is decelerated by the oval gears until the last mentioned signature has been gripped and is being withdrawn by the drum from the hopper, after which the drum is again accelerated as already mentioned, until just prior to the first withdrawn signature engaging in the V-stop 129. When the signature engages in the V-stop 129 the gripper is opened to release the signature and the latter comes to a stop and has its position squared in the V-stop. At this time the grippers 141 on the conveyor chains 137 close and grip the open edges of the stopped signature and positively pull the signature from off the transfer drum without this signature contacting the succeeding signatures on the drum and in between the supporting bars 145 and the chain 137 and then between the belt 130 and the chain 137 and until the grippers 141 are opened by the cam plate 146 adjacent the sprocket 138, after which the belt 130 frictionally continues the forward movement of the signature beneath the guide plate 147 and against the normally closed gate 148, whereupon the forward movement of the signature momentarily terminates but the action of the belt on the signature tends to move it forwardly and functions to square the latter against the gate. The gate 148 is then opened by the cam 156 and the belt 130 acts to move the squared signature forwardly beyond the gate and under the extended portion of the guide 147 and into a position where its open edges are gripped by grippers on the opening rolls 139 and 140. The rotation of the opening rolls initiates the opening of the signature and carries its open edges downwardly to a point where they are gripped by grippers on the opening chains 66 and 67, after which said chains positively move the signature downwardly and deposit it upon the saddle conveyor 70, all as is fully described in said Spisak Patent No. 2,507,281.

From the foregoing description of the operation it will be noted that a plurality of the signatures are transferred by the drum 119 simultaneously and during each complete rotation of the drum, thus speeding up the rate of signature transfer from the hopper to the conveying means. In addition this rate of transfer is speeded up by the acceleration and deceleration in the rotation of the transfer drum due to the use of the oval gears, it being recalled that the drum is decelerated during the gripping of the signature and then accelerated to withdraw the signature from the hopper and move it in a transferring direction. It will further be noted that the grippers on the transfer drum and the grippers on the conveying chains function to pull the signatures through their paths of transfer and movement as distinguished from arrangements wherein the signatures are pushed. This improves the efficient operation of the mechanism and avoids all likelihood of the signatures being buckled or distorted in a way which would cause the machine to jam. In other words, the signatures are transferred and moved substantially and entirely by a positive pulling action.

It will also be noted that during the transfer and the movement of the signatures they are twice squared and properly positioned, namely, when they engage in the V-stop 129, and again when they engage the gate 148. The effect of this arrangement is to improve the dependability of operation of the mechanism and to assure the proper opening of the signatures by the opening rolls and opening chains.

It will also have been seen that due to the L-shaped movement of the pusher arms they first rise between the foremost signature and the remaining signatures and then push the latter rearwardly in the hopper into a compact group to free the foremost signature from the remaining signatures and the manner in which the feeler follows the pusher arms until contacting the compressed group of signatures provide an improved and efficient feed control for the signatures in the hopper and thus facilitates the efficient operation of the machine as a whole since it assures the proper positioning of the signatures to be bent by the suction arms and withdrawn from the hopper by the transfer drum. Also it will have been noted that the feeler operation controls the feeding of the signatures in the hopper and that the feeler, when the signatures have not been previously properly fed forwardly, moves an additional distance to cause a greater feeding movement to be imparted to the signatures.

The expression "horizontal hopper" as used herein means a hopper in which the signatures are stacked on edge with the signatures arranged in a substantially horizontal row.

Although a preferred embodiment of the invention has been illustrated and described herein for illustrative purposes, it will be understood that the invention is susceptible of various modifications and adaptations within the scope of the appended claims.

Having thus described my invention, I claim:

1. In a signature feeding and transferring mechanism unit of a signature collator; a hopper in which the signatures are stacked, a transfer and extracting drum located adjacent said hopper, means for bending a portion of successive signatures outwardly of the hopper into close proximity with the periphery of said drum preparatory to the bent signature being gripped and extracted from the hopper, a signature pushing means, means for actuating said pushing means to move the same between the bent signature and the remaining signatures in the hopper and then to move the same linearly in a direction substantially transverse to its first named movement, said means for actuating the pushing means comprising an elongated member connected adjacent one of its ends to said pusher means and operatively connected adjacent its other end to said hopper for pivotal and longitudinal movement, said member being provided with a camming surface, and cam actuated means contacting said surface to impart to said member successively the pivotal and longitudinal movements thereof.

2. In a signature feeding and transferring mechanism unit of a signature collator; a hopper in which the signatures are stacked, a transfer and extracting drum located adjacent said hopper, means for bending a portion of said successive signatures outwardly of the hopper into close proximity with the periphery of said drum preparatory to the bent signature being gripped and extracted from the hopper, a signature pushing means, means for actuating said pushing means to move the same between the bent signature and the remaining signatures in the hopper and then to move the same linearly in a direction substantially transverse to its first named movement to push the remaining signatures into a compacted group, a feeler, means for moving said feeler into engagement with said compacted group of remaining signatures, and means for variably feeding the signatures in the hopper and operatively associated with said feeler and said feeler moving means, said feeler being provided with a cam surface, said feeler having a rockable hub portion provided with a cam surface, said signature feeding means including a driven ratchet and a driving pawl, said pawl having a portion contacting said cam surface to control the engagement of the pawl with said ratchet and in turn to control the amplitude of feeding movement imparted to the ratchet.

3. In a signature feeding and transferring mechanism unit of a signature collator; a hopper in which the signatures are stacked, an extracting and transfer drum located closely adjacent to the extracting end of said hopper, means for rotating said drum, pivoted means for bending the folded edge of successive signatures in the hopper outwardly into close proximity to the periphery of said drum, a plurality of gripper means carried by said drum and spaced circumferentially thereof for gripping to the drum during each drum rotation the folded edge of a plurality of successively bent signatures, said plurality of gripper means each acting successively during a single drum rotation to grip and extract a bent signature from said hopper and to then transfer the same on the drum with its folded edge foremost and then release the gripped and transferred signature, stop means in the path of movement of the folded edge of the transferred signatures and located substantially on the radial line from the drum axis to the pivotal center of said bending means, and means for operating said signature bending means and each of said gripping means at predetermined times in each drum revolution such that each time the folded edge of a transferred signature engages said stop means the gripper means which grips said transferred signature simultaneously releases the same, while said bending means substantially simultaneously with the release of the transferred signature bends the foremost signature in the hopper and then said gripping means which has just released the transferred signature grips the newly bent signature.

4. In a signature feeding and transfer mechanism unit of a signature collator as defined in claim 3 and wherein said means for rotating said drum includes a drive train to said drum having therein drive elements which produce a plurality of periods of acceleration and deceleration in the drum rotation during each revolution thereof, said engagement of the transferred signatures with said stop means occurring substantially at the end of a period of deceleration and said gripping of the bent signatures by the gripping means occurring substantially at the beginning of a period of acceleration.

5. In a signature feeding and transferring mechanism unit of a signature collator as defined in claim 3 and wherein the means for rotating said drum includes a drive train to said drum having therein a pair of intermeshing elliptical gears providing during each drum rotation a plurality of periods of acceleration and deceleration in drum movement, each transferred signature engaging said stop means substantially at the end of a period of deceleration and each of said gripping means gripping a newly bent signature substantially at the beginning of a period of acceleration.

6. In a signature feeding and transferring mechanism unit of a signature collator as defined in claim 3 and wherein there is provided a substantially horizontally movable transfer and conveyor means located above said drum and provided with grippers acting to grip the open edges of the released signatures in said stop means to pull said signatures off the drum and convey them away therefrom, gate means located at the outer end of the transfer and conveying means and against which the conveyed signatures successively come to rest and are squared thereby, and means for periodically and automatically opening said gate.

EARL H. BECHBERGER.

REFERENCES CITED

The following references are of record in the file of this patent:

UNITED STATES PATENTS

| Number | Name | Date |
| --- | --- | --- |
| Re. 21,489 | Kleineberg et al. | June 25, 1940 |
| Re. 21,707 | Davidson | Feb. 4, 1941 |
| 650,543 | North | May 29, 1900 |
| 851,184 | Spalckhaver | Apr. 23, 1907 |
| 2,027,818 | Golber | Jan. 14, 1936 |
| 2,143,049 | Belluche | Jan. 10, 1939 |
| 2,192,908 | Harrold | Mar. 12, 1940 |
| 2,219,608 | Ackley | Oct. 29, 1940 |
| 2,223,391 | Schweitzer | Dec. 3, 1940 |
| 2,251,943 | Kleineberg | Aug. 12, 1941 |
| 2,361,907 | Baker | Nov. 7, 1944 |
| 2,413,358 | Kleineberg | Dec. 31, 1946 |